(12) United States Patent
Sun et al.

(10) Patent No.: US 12,509,596 B2
(45) Date of Patent: Dec. 30, 2025

(54) NANOCOMPOSITE COATING SYSTEM VIA ONE-STEP CO-ASSEMBLY

(71) Applicants: THE UNIVERSITY OF CONNECTICUT, Storrs, CT (US); KANEKA AMERICAS HOLDING, Pasadena, TX (US); KANEKA CORPORATION, Osaka (JP)

(72) Inventors: Luyi Sun, Storrs, CT (US); Anna Marie Lachance, Storrs, CT (US); Tianlei Zhou, College Station, TX (US); Young Lim, College Station, TX (US)

(73) Assignees: THE UNIVERSITY OF CONNECTICUT, Storrs, CT (US); KANEKA AMERICAS HOLDING, Pasadena, TX (US); KANEKA CORPORATION, Osaka (JP)

( * ) Notice: Subject to any disclaimer, the term of this patent is extended or adjusted under 35 U.S.C. 154(b) by 0 days.

(21) Appl. No.: 17/635,773

(22) PCT Filed: Oct. 16, 2020

(86) PCT No.: PCT/US2020/056105
§ 371 (c)(1),
(2) Date: Feb. 16, 2022

(87) PCT Pub. No.: WO2021/080876
PCT Pub. Date: Apr. 29, 2021

(65) Prior Publication Data
US 2022/0325117 A1    Oct. 13, 2022

Related U.S. Application Data

(60) Provisional application No. 62/923,890, filed on Oct. 21, 2019.

(51) Int. Cl.
C09D 7/40 (2018.01)
C09D 7/20 (2018.01)
(Continued)

(52) U.S. Cl.
CPC ............... *C09D 7/70* (2018.01); *C09D 7/61* (2018.01); *C09D 129/04* (2013.01); *C08K 3/042* (2017.05);
(Continued)

(58) Field of Classification Search
CPC .... C08K 7/00; C08K 3/346; C08K 2201/011; C08K 2201/016; C08K 3/042; C08K 3/34;
(Continued)

(56) References Cited

U.S. PATENT DOCUMENTS 7,776,955 B2    8/2010  Reinheimer et al.

FOREIGN PATENT DOCUMENTS

CN    103319827 A  *  9/2013
KR    101622508 B1 *  5/2016

OTHER PUBLICATIONS

"Effect of aspect ratio of graphene oxide on properties of poly(vinylalcohol) nanocomposites" to Morimune-Moriy et al. Nanocomposites, 5:3, 84-93, DOI: 10.1080/20 (Year: 2019).*

(Continued)

*Primary Examiner* — Shuangyi Abu Ali
(74) *Attorney, Agent, or Firm* — Morgan, Lewis & Bockius LLP

(57) ABSTRACT

The invention relates to a nanocomposite coating system that exhibits superior barrier properties for reducing the ingress of unwanted guest species such as moisture (e.g., water vapor) and a facile method for preparing the same nanocoating system on an industrial scale. The current (Continued)

coating materials are able to reduce the overall ingress of unwanted guest species in a substantial improvement over the prior art.

20 Claims, 6 Drawing Sheets

(51) Int. Cl.
  *C09D 7/61*    (2018.01)
  *C09D 129/04*   (2006.01)
  *C08K 3/04*    (2006.01)
  *C08K 3/34*    (2006.01)

(52) U.S. Cl.
  CPC ........ *C08K 3/346* (2013.01); *C08K 2201/011* (2013.01); *C08K 2201/016* (2013.01)

(58) Field of Classification Search
  CPC .......... C09D 129/04; C09D 7/61; C09D 7/70; C09D 7/20; C01B 32/198; C08J 2323/06; C08J 2323/12; C08J 2367/04; C08J 2429/04; C08J 2439/06; C08J 7/0427; C08J 7/048

See application file for complete search history.

(56) References Cited

OTHER PUBLICATIONS

"PVA / Montmorillonite Nanocomposites: Development and Properties" to Sapalidis et al. Nanocomposites and polymers with analytical methods, 2011 (Year: 2011).*

International Search Report/Written Opinion issued on Jan. 27, 2021 in PCT/US2020/056105.

Kim et al., "Fabrication of graphene oxide/montmorillonite nanocomposite flexible thin films with improved gas-barrier properties," Royal Society of Chemistry, 2018, pp. 39083-39089.

* cited by examiner

NANOCOMPOSITE COATING SYSTEM VIA ONE-STEP CO-ASSEMBLY

FIELD OF THE INVENTION

This invention relates to a nanocomposite coating system containing structures of varying sizes and includes in an exemplary embodiment a combination of sheet-like structures, where one has a relatively high-aspect ratio (hereinafter, "HAR sheets" or "[HAR] sheets"), and at least one other has a relatively low-aspect ratio (hereinafter, "LAR sheets" or "[LAR] sheets") within a polymer binder, which imparts the coating system with unexpected barrier capabilities to block the transmission of unwanted guest species, in addition to exhibiting increased heat resistance, corrosion resistance, as well as increased conductor or dielectric capabilities.

BACKGROUND OF THE INVENTION

The aspect ratio of sheet-like structures is defined, via a disc approximation to the sheet shape, by dividing the major diameter by the thickness. A sheet-like structure may have a high or a low aspect ratio. In general, a material with a higher aspect ratio will correspond to lower buckling strength in the sheet-like structure of the corresponding material. Thus, there tends to be more curving or curling when a high aspect ratio sheet is created. Conversely, a low aspect ratio will correspond to a higher buckling strength and lower curving. Thus, both HAR and LAR sheets are combined in the system, with an aim that LAR sheets can help minimize unwanted curling and curvature of HAR sheets in the coating system.

One such nanocomposite coating system contains graphene oxide ("GO") [HAR] sheets and montmorillonite ("MMT") [LAR] sheets (formed in one embodiment from the exfoliation of GO and sodium-MMT clay in water), assembled into a layered structure in poly(vinyl alcohol) (PVA) to form a thin nanocomposite coating that can block moisture (e.g., water vapor) and other entrants. Other binary or ternary or larger systems can be created with additional polymer binder designs that exhibit different properties based on the layering and structure of the nanocomposite coating.

SUMMARY OF THE INVENTION

The invention described details a scalable nanoscale barrier that exhibits exceptional oxygen and water vapor barrier capabilities.

The data presented in Table 1 is based on coatings on a PLA substrate (about 20 μm in thickness, WVTR ~98 gm/(m²·day) tested at 23° C. and 50% relative humidity (RH) and OTR ~1205 mL/gm/(m²·day) tested at 23° C. and 0% RH. Table 1. Permeability data for GO/MMT coatings. The barrier improvement factor (BIF) is defined as $P_s/P_t$, where $P_s$ is the permeability of the substrate and $P_t$ is the permeability of the coated substrate.

| GO Size | Coating System | Meaning | Thickness (nm) | OTR (cc/m²/day) | O2 Permeability of total [cm3mm/m2 · day atm] | Oxygen Permeability of Coating Layer (cm3mm/m2 · day atm) |
|---|---|---|---|---|---|---|
| — | (PLA Film) | Uncoated Substrate | 20 μm | 1205.0 | 24.100 | — |
| — | PLA-PVA | 0% filler loading | 450 ± 25 | 9.4 | 0.192 | 4.26E−03 |
| — | PLA-PVA/MMT-50-C | 50% MMT loading | 620 ± 23 | 0.2 | 0.004 | 1.24E−04 |
| Small (2 hr sonication) | PLA-PVA/GO-99.99/0.01 | 0.01% GO, 99.99% PVA | — | — | — | — |
| | PLA-PVA/GO-99.9/0.1 | 0.1% GO, 99.9% PVA | 399.3 ± 54.7 | 17.9 | 3.65E−01 | 7.25E−03 |
| | PLA-PVA/GO-99/1 | 1% GO, 99% PVA | 323.6 ± 76.6 | 8.5 | 1.72E−01 | 2.76E−03 |
| | PLA-PVA/GO-90/10 | 10% GO, 90% PVA | 287.3 ± 37.9 | 1.6 | 3.32E−02 | 4.71E−04 |
| Large (30 m sonication) | PLA-PVA/GO-99.99/0.01 | 0.01% GO, 99.99% PVA | — | — | — | — |
| | PLA-PVA/GO-99.9/0.1 | 0.1% GO, 99.9% PVA | 478.7 ± 201.2 | 19.7 | 4.03E−01 | 9.58E−03 |
| | PLA-PVA/GO-99/1 | 1% GO, 99% PVA | 263.5 ± 51.9 | 4.8 | 9.81E−02 | 1.28E−03 |
| | PLA-PVA/GO-90/10 | 10% GO, 90% PVA | 463.3 ± 73.1 | 0.88 | 1.80E−02 | 4.09E−04 |
| Small (2 hr sonication) | PLA-PVA/GO/MMT-50/0.01/49.99 | 0.01% GO, 49.99% MMT | 504 ± 81 | 0.0226 | 4.63E−04 | 1.14E−05 |
| | PLA-PVA/GO/MMT-50/0.1/49.9 | 0.1% GO, 49.9% MMT | 384 ± 59 | 0.0095 | 1.94E−04 | 3.65E−06 |
| | PLA-PVA/GO/MMT-50/1/49 | 1% GO, 49% MMT | 591 ± 37 | 0.0018 | 3.71E−05 | 1.0638E−06 |
| | PLA-PVA/GO/MMT-50/10/40 | 10% GO, 40% MMT | 655 ± 21 | 0.0007 | 1.45E−05 | 4.5850E−07 |
| Large (30 m sonication) | PLA-PVA/GO/MMT-50/0.01/49.99 | 0.01% GO, 49.99% MMT | 396 ± 44 | 1.1227 | 2.29E−02 | 4.45E−04 |
| | PLA-PVA/GO/MMT-50/0.1/49.9 | 0.1% GO, 49.9% MMT | 558 ± 74 | 0.0945 | 1.94E−03 | 5.28E−03 |
| | PLA-PVA/GO/MMT-50/1/49 | 1% GO, 49% MMT | 675 ± 81 | 0.0319 | 6.60E−04 | 2.15E−05 |
| | PLA-PVA/GO/MMT-50/10/40 | 10% GO, 40% MMT | 699 ± 24 | 0.0057 | 1.18E−04 | 3.98E−06 |

-continued

| GO Size | Coating System | Oxygen BIF | WVTR (gm/m²/day) | Water Vapor Permeability of total [10−11 g(STP)cm/cm2 · s] | Water Vapor Permeability of Coating Layer [10−11 gcm(STP)cm/cm2 · s] | Water Vapor BIF |
|---|---|---|---|---|---|---|
| — | (PLA Film) | 1 | 98.2 | 22.7300 | — | — |
| — | PLA-PVA | 125 | 34.8 | 8.24 | 0.2809 | 2.8 |
| — | PLA-PVA/MMT-50-C | 5844 | 13.1 | 3.13 | 0.1086 | 7.3 |
| Small (2 hr sonication) | PLA-PVA/GO-99.99/0.01 | — | — | — | — | — |
| | PLA-PVA/GO-99.9/0.1 | 66 | 27.9 | 6.5893 | 0.1801 | 3.4 |
| | PLA-PVA/GO-99/1 | 140 | 23.5 | 5.5278 | 0.1157 | 4.1 |
| | PLA-PVA/GO-90/10 | 72.5 | 7.3 | 1.73 | 0.0383 | 13.2 |
| Large (30 m sonication) | PLA-PVA/GO-99.99/0.01 | — | — | — | — | — |
| | PLA-PVA/GO-99.9/0.1 | 60 | 32.4 | 7.6796 | 0.2681 | 3.0 |
| | PLA-PVA/GO-99/1 | 246 | 21.3 | 5.0057 | 0.0830 | 4.5 |
| | PLA-PVA/GO-90/10 | 1337 | 1.2 | 1.9894 | 0.0408 | 11.4 |
| Small (2 hr sonication) | PLA-PVA/GO/MMT-50/0.01/49.99 | 52008 | 3.1 | 0.7357 | 0.0187 | 30.9 |
| | PLA-PVA/GO/MMT-50/0.1/49.9 | 124453 | 2.5 | 0.5919 | 0.0114 | 38.4 |
| | PLA-PVA/GO/MMT-50/1/49 | 650230 | 1.7 | 0.4051 | 0.0118 | 56.1 |
| | PLA-PVA/GO/MMT-50/10/40 | 1666840 | 1.2 | 0.29 | 0.0093 | 79.2 |
| Large (30 m sonication) | PLA-PVA/GO/MMT-50/0.01/49.99 | 1053 | 3.6 | 0.8498 | 0.0171 | 26.7 |
| | PLA-PVA/GO/MMT-50/0.1/49.9 | 12401 | 1.4 | 0.3398 | 0.0094 | 66.9 |
| | PLA-PVA/GO/MMT-50/1/49 | 36541 | 1.0 | 0.2304 | 0.0076 | 98.6 |
| | PLA-PVA/GO/MMT-50/10/40 | 204265 | 0.3 | 0.0719 | 0.0024 | 316.3 |

BRIEF DESCRIPTION OF THE DRAWINGS

Specific embodiments of the invention are described in detail with reference to the accompanying figures. Numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

DETAILED DESCRIPTION OF THE INVENTION

The invention can be achieved via a number of coating technologies, including one embodiment that involves simple dip-coating, where HAR sheets and LAR sheets are aligned through gravity-induced shear forces. The dip-coating method promotes the interaction of the GO [HAR] sheets and the MMT [LAR] sheets, aligning the GO [HAR] sheets within and among the MMT [LAR] sheets. The invention can also be applied via other methods, such as via doctor blading, spin coating, rotational coating, spray coating, or roll-to-roll coating. This scalable coating technology can be employed in a number of applications, such as packaging, electronics (e.g., LCDs, OLEDs, etc.), chemical, or construction, in which it may be desirable to prevent the transfer of unwanted guest species, like water vapor (humidity), into a moisture-sensitive or moisture-reactive environment. Additional embodiments may apply to, for example, heat resistance or dielectric capabilities, corrosion resistance, or electric conductor applications.

Figure 1:
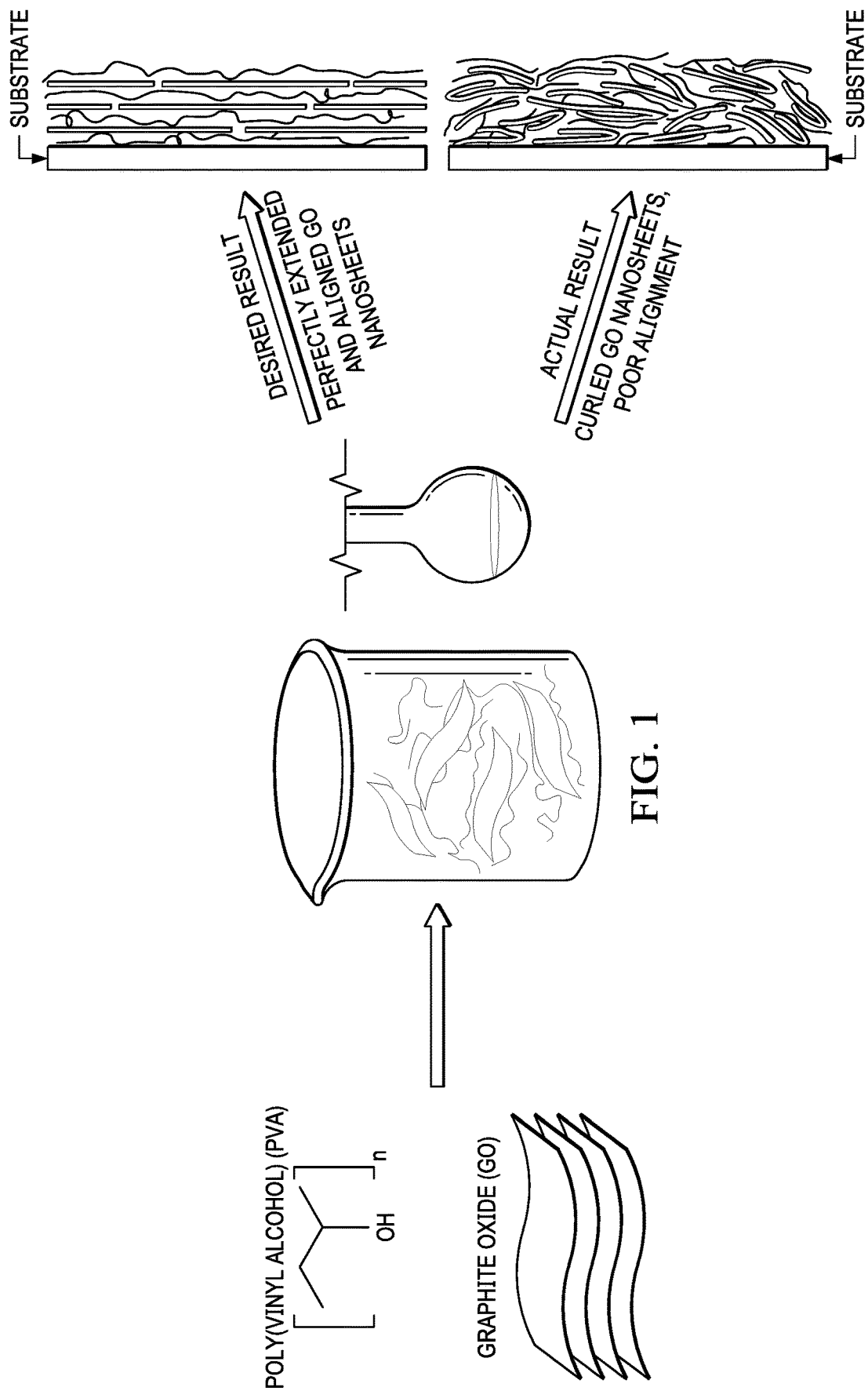
FIG. 1 illustrates an embodiment of a PVA/GO coating and multi-layer co-assembly. The intended outcome of co-assembly is well-ordered GO sheets, however, due to the significant curvature of HAR sheets, this effect is not achieved.
Figure 2:
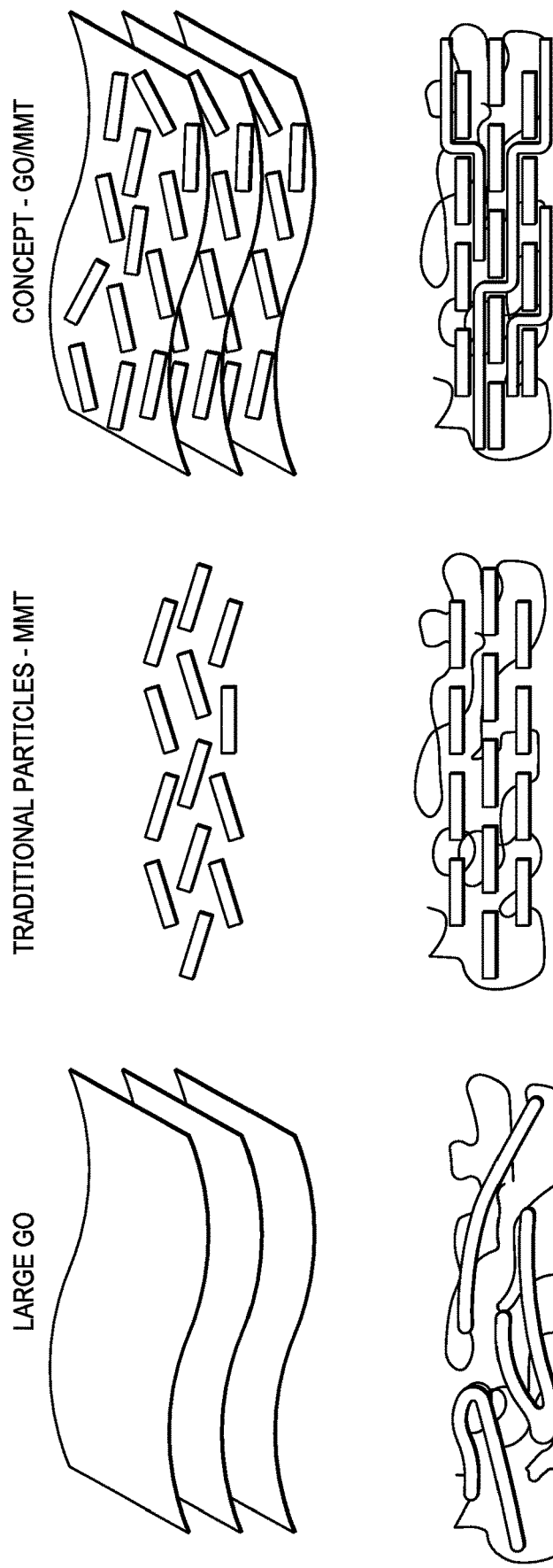
FIG. 2 illustrates a hypothesized improvement to the moisture barrier by incorporation of both GO and MMT. Large GO sheets are preferable to form a moisture barrier, but they tend to become misshapen during processing. However, small, rigid MMT sheets are suitable for supporting the large GO sheets during co-assembly into a polymer binder.
Figure 3:
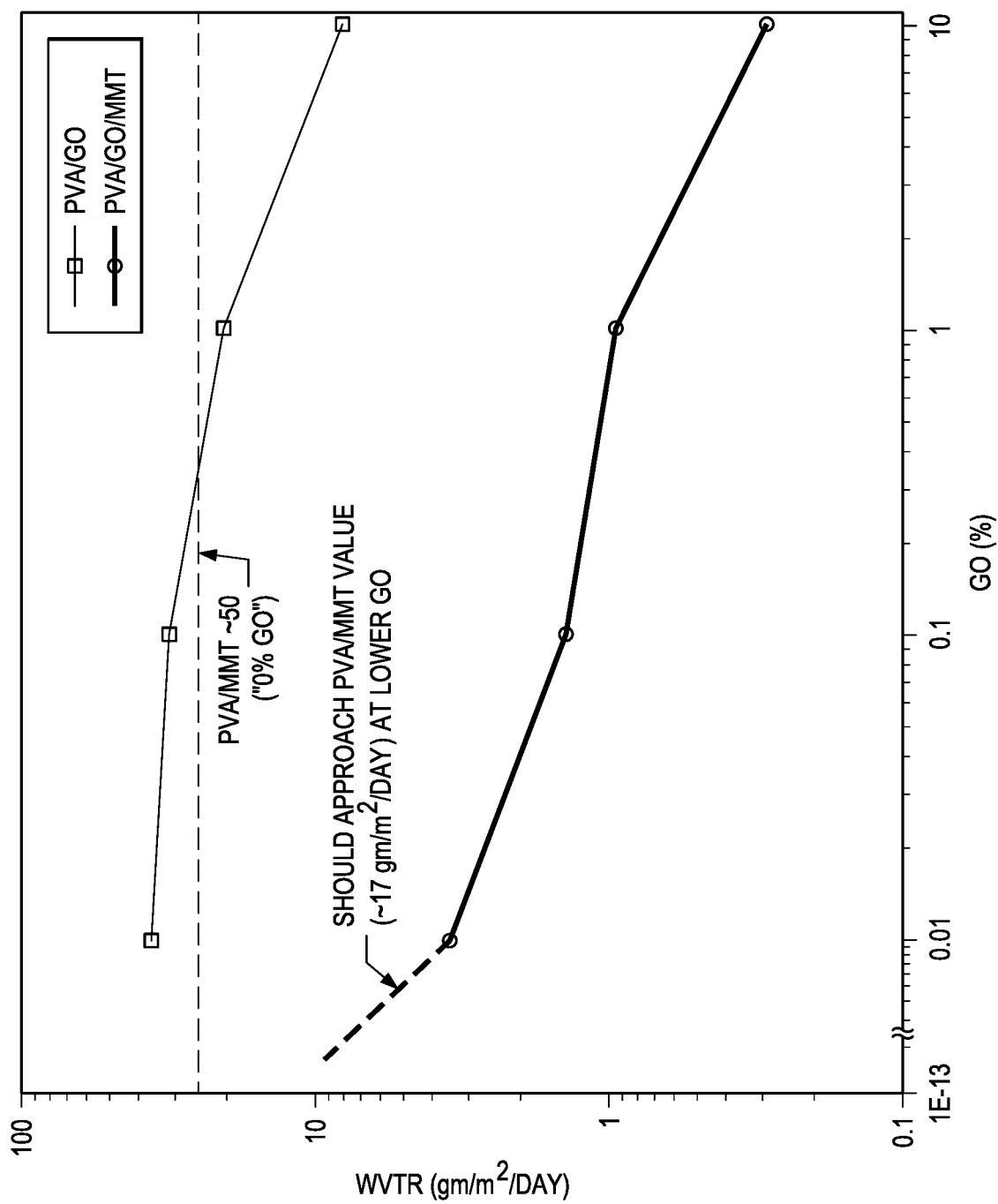
FIG. 3 illustrates water vapor transmission rate (WVTR) data, not normalized for thickness, for the GO and GO/MMT coatings on PLA. Coatings of GO alone are shown to have lower WVTR values at only 10% GO in 90% PVA, demonstrating that larger sheets are preferable to form a barrier but their ability to extend this effectiveness to block water vapor is very limited without MMT. WVTR is shown to be decreased below the value for 50% MMT/50% PVA coatings at only 0.01% GO, with higher concentrations of larger GO sheets having even a lower WVTR.
Figure 4:
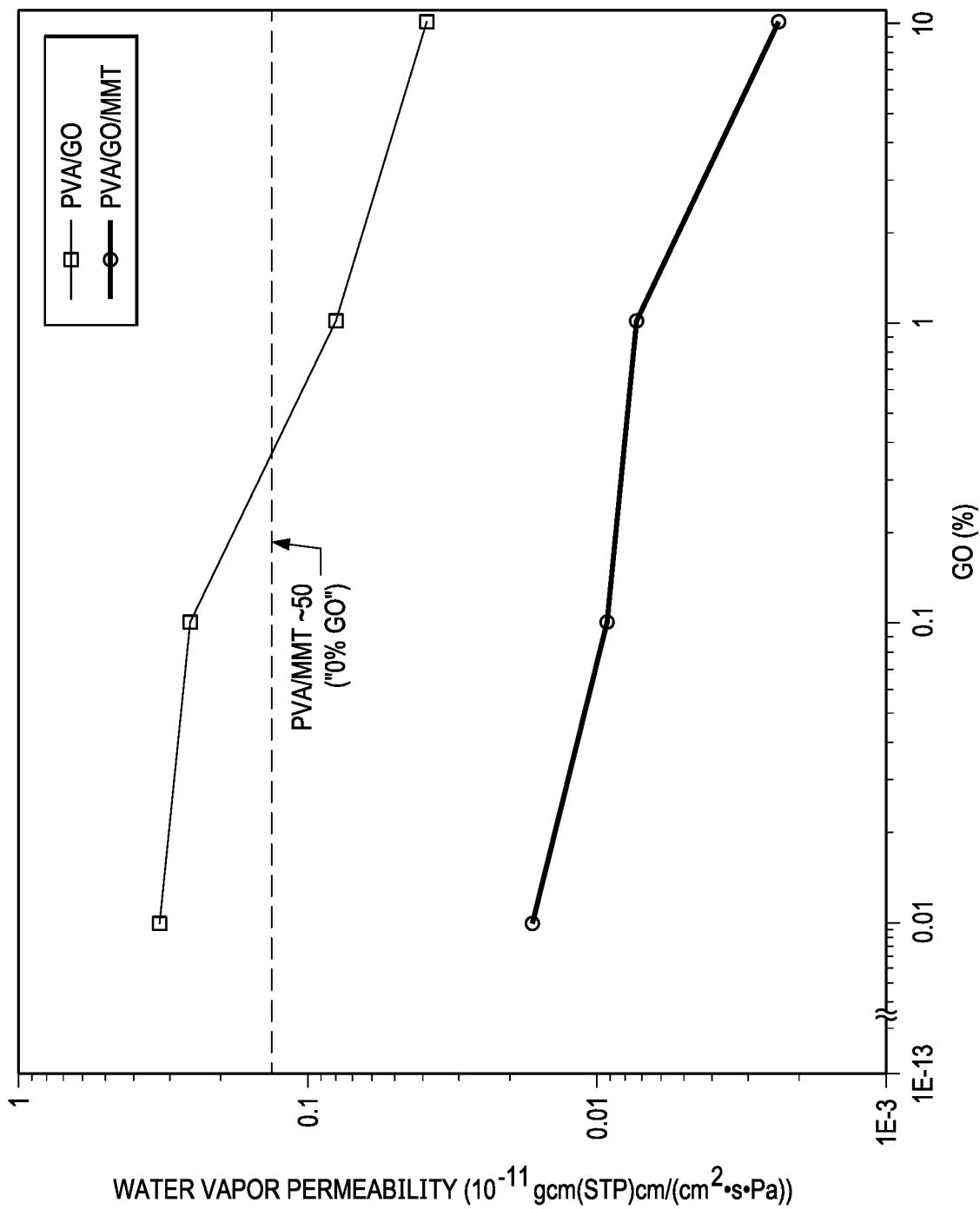
FIG. 4 illustrates thickness-normalized WVTR data for GO and GO/MMT coating layers alone. These values represent the inherent property of permeability of the coating layer alone, without the effects of the PLA substrate.
Figure 5:
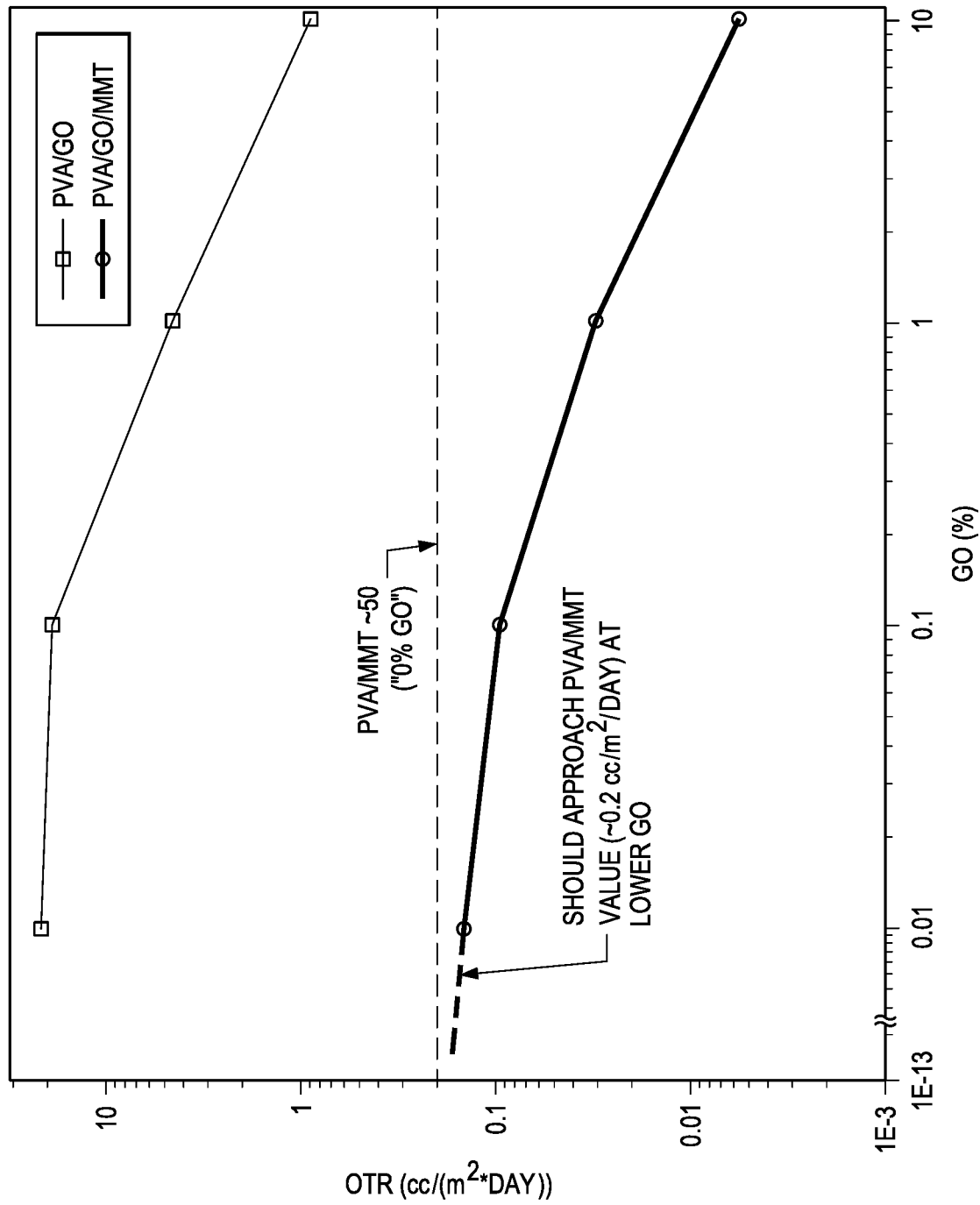
FIG. 5 illustrates oxygen transmission rate (OTR) data, not normalized for thickness, for the GO and GO/MMT coatings on PLA. Coatings of GO alone are shown to have lower OTR values at only 10% GO in 90% PVA, demonstrating that larger sheets are preferable to form a barrier but their ability to extend this effectiveness to block oxygen is very limited without MMT. However, with the addition of MMT, at even 0.01% GO, the OTR is improved beyond the highest capabilities of PVA/MMT coatings.
Figure 6:
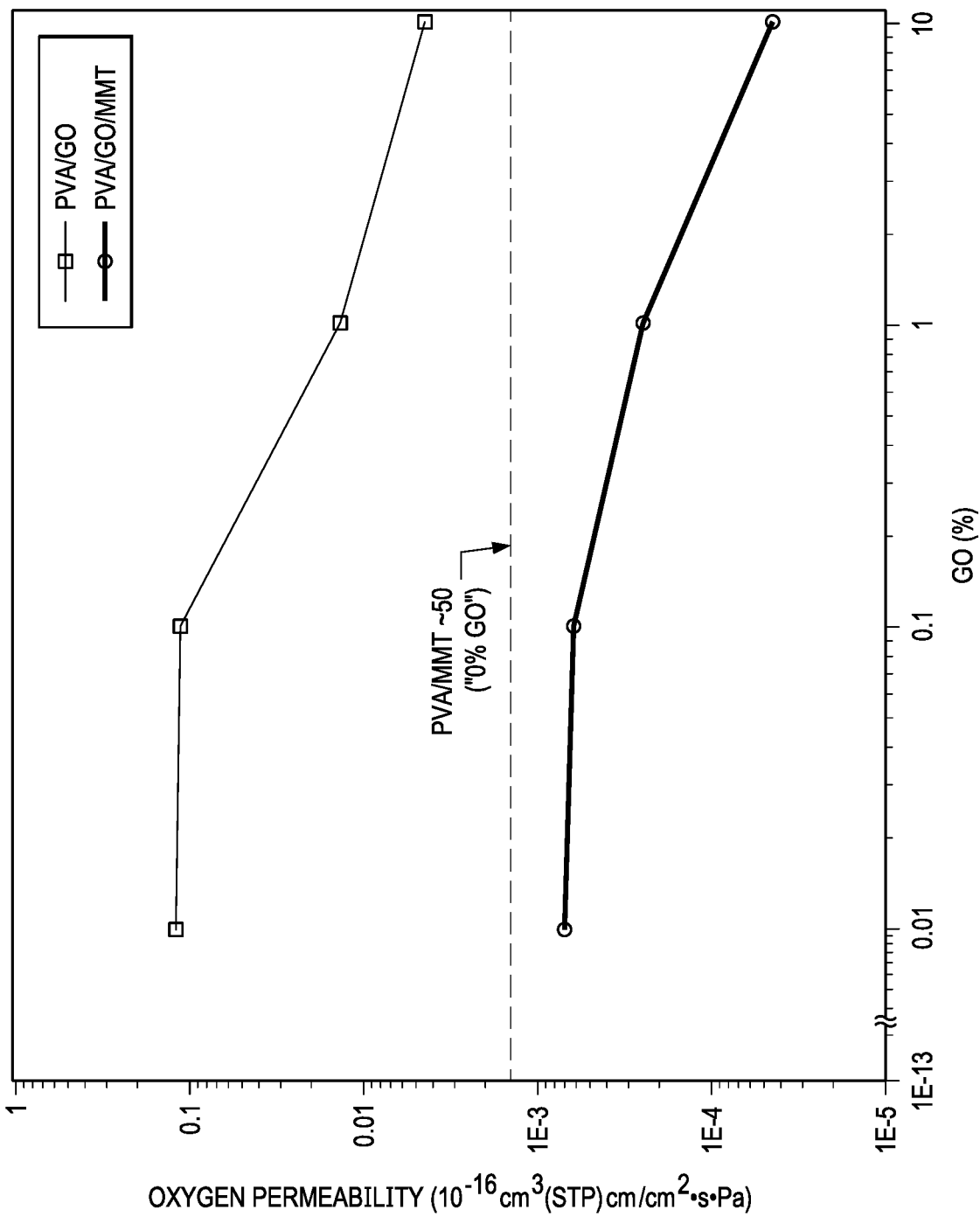
FIG. 6 illustrates thickness-normalized OTR data for GO and GO/MMT coatings layers alone. These values represent the inherent property of permeability of the coating layer alone, without the effects of the PLA substrate. Even when normalized for thickness, it is clear that PVA/GO/MMT coating layers have an inherently lower oxygen permeability than either PVA/GO or PVA/MMT coating layers.

In a particular nanocomposite coating system, GO, MMT, and PVA are combined in various ratios in an aqueous suspension (for example, 98.5% water, 1.5% solids). In an exemplary binary nanocomposite coating system, GO and MMT are exfoliated from bulk material (via ultrasonication) into HAR sheets and LAR sheets, respectively, which can then be assembled into layered structures via dip-coating. The PVA (or other suitable polymer) acts as a binder for the layered structures, and polymer relaxation occurs during the drying process (in one embodiment at 60° C. for 30 minutes) after each coating cycle to help align the HAR sheets and LAR sheets into a highly-ordered structure. Larger, more flexible GO [HAR] sheets provide superior coverage of a material's surface while being extended and supported by smaller, more rigid MMT [LAR] sheets, which help to minimize the curving/curling tendencies of the larger GO [HAR] sheets, thus resulting in an excellent physical barrier to unwanted guest species, such as water vapor transport (see FIG. 1). Note that any HAR sheets, regardless of their composition, are flexible due to the fact that the buckling strength of any part decreases with an increasing aspect ratio. When the aspect ratio is sufficiently high (e.g. greater than a factor of 500), the part will be flexible, tending to curve or curl because of its sufficiently low buckling strength. For barrier properties, HAR sheets without curving or curling are highly desirable, according to various simulation models such as the Nielsen model.

Materials exhibiting moisture barrier properties are highly desirable due to their applicability in sealing, encapsulation, and packaging. Such materials include, but are not limited to, metal, glass/ceramic, and polymers (such as polyethylene, polypropylene, or polyamide films), among which polymers typically provide the most promising solutions due to their lighter weight, lower cost, and better processability. The barrier properties of polymers can be achieved/enhanced by a molecular structure design that takes advantage of the hydrophobic nature of some chemical functional groups or the overall crystallinity of the resultant polymers. In another approach, plastic films are prepared with a greater thickness to further diminish their water vapor transmission rate ("WVTR"). Alternatively, films are coated with a low-permeability polymer or polymer composite, optionally in the presence of a rod- or sheet-like nanofiller. The above-described methods either introduce undesirable processability and/or have cost issues, or do not sufficiently block unwanted guest species transport. Therefore, an urgent need exists to develop a material that exhibits a superior barrier performance, such as water vapor blocking properties, and that is cost-effective and does not involve processability issues.

MMT has been used in combination with PVA in the preparation of a coating material on a 20 μm thick poly (lactic acid) (PLA) substrate. (L. Sun, et al. DOI: 10.1126/sciadv.1701212). A WVTR test was conducted on coating thicknesses ranging from 450 μm to 650 μm with the amount of MMT being varied as well. The lowest WVTR result measured on a coated 20 μm PLA substrate with the amount of MMT up to 50 wt. % was 17.2 g/(m$^2$·day), corresponding to a water vapor permeability of 0.1424 [$10^{-11}$ g(STP)·cm/cm$^2$·s·Pa] of the coating layer (Table 1). Thus, water vapor barrier property of the system of MMT and PVA need be improved. Additionally, upon oxygen transmission rate ("OTR") test, the lowest OTR result measured on a coated 20 μm PLA substrate with the amount of MMT up to 50 wt. % was 0.2 cc/m$^2$/day, corresponding to an oxygen permeability of 0.00135 [$10^{-16}$ cm$^3$(STP)cm/cm$^2$·s·Pa] of the coating layer (Table 1). While the oxygen permeability is overall rather impressive, it is still not sufficient for some high-end applications, such as electronic packaging.

The WVTR and OTR tests were also conducted on the coatings of the current invention for comparison. The described novel binary approach takes advantage of the observed synergistic effect between GO (with a lateral dimension of ca. 1 μm) and MMT (with an average lateral dimension of ca. 260 nm), and achieved a superior WVTR value of 0.3 g/(m$^2$·day), or a moisture permeability of 0.0024 [$10^{-11}$ g(STP)·cm/cm$^2$·s Pa] (Table 1), when tested on a 20 μm PLA substrate using similar coating thicknesses at the same total concentration of sheets (10% GO+40% MMT). This result equates to an allowance of only 1.7% water vapor intrusion based on the prior art. Similarly, the coatings achieved a superior OTR value as low as 0.0057 cc/(m$^2$·day), or an oxygen permeability of 0.0000455 [$10^{-16}$ cm$^3$ (STP)cm/cm$^2$·s·Pa], an allowance of only 3.4% oxygen intrusion compared to the prior art. This binary approach and the GO/MMT layering is only one of many available options, as other available substrates and binary or ternary layered systems are able to create the same or similar superior barrier effect. Suitable substrates for the present invention are not particularly limited and include any plastic films (such as PLA, BOPP, HDPE, and LDPE), foams, board sheets, paper, wood, and metal. In addition, other than PVA, other polymers may serve as a binder to integrate the binary or ternary layered systems, such as epoxy, polyvinylpyrrolidone (PVA), poly(acrylic acid), poly(2-oxazoline), polyethyleneimine, polyacrylamide, copolymers of PVA, copolymers of above-mentioned polymers, etc.

This superior result is in part due to the fact that GO provides larger HAR sheets and a strong interface with PVA. At the same time, the MMT can exfoliate into smaller, more rigid LAR nanosheets. When these two features are combined, the larger and more flexible GO [HAR] sheets are better extended with a lower degree of curving/curling by the rigid MMT [LAR] sheets. As a result, such less curved/curled GO [HAR] sheets can much more effectively block the penetration of unwanted guest species and thus lead to a much-improved barrier property, according to many experimental results as well as various simulation models, such as the Nielson model. The GO [HAR] sheets can also effectively crosslink with the polymer network, creating a strong, layered structure that is less susceptible to swelling due to moisture absorption. Additional larger HAR sheets and smaller LAR sheets can be combined to effectively create a system similar to the GO/MMT example provided herein. However, the distribution of sizes of sheets/nanosheets creates differing barrier properties. In general, one of the main blocking effects results from the HAR nanosheets with limited curving or curling.

In addition, the blending of these two 2D materials of different sizes further blocks the transmission paths of unwanted guest species by creating more effective space-filling in the coating layers. In other formulations, the GO sheets were allowed to curl and created issues arising from curling in the sheets. In the current formulation, the physical structure/composition of the coating compensates for the undesirable curling issue of the large GO [HAR] sheets with the assistance of the smaller MMT [LAR] nanosheets. This novel combination of two structures of different lateral sizes and rigidities unexpectedly leads to some of the best barrier results (blocking water vapor and other unwanted guest species) reported in the literature and also allows for a simple and scalable coating method (for example, dip-coating) that is cost-effective and compatible with existing film/coating mass-production systems. This alignment of HAR sheets and LAR nanosheets via dip-coating or other conventional coating methods demonstrates a novel approach not reported in barrier material development.

Further, it is known that thicker plastic substrates are more difficult to process by film-blown extrusion with continued difficulty down the line. This translates into increasing cost with increasing thickness and increased environmental concerns regarding disposal of more plastic. In contrast, a thinner plastic substrate in combination with a thinner GO/MMT/coating film translates into more facile substrate processing, which results in cost reduction while also improving the properties of the entire system.

Although GO is more expensive than MMT, it is well-known and widely available. In addition, the overall costs associated with the preparation of the coating compositions of the present invention can be substantially reduced by minimizing the amount of the GO relative to MMT (such as 49% MMT and 1% GO) while still achieving the desired levels of gas barrier and mechanical properties of the coated substrate.

MMT is more rigid than GO and exfoliates freely in water. Exemplary ranges for the relative amounts of GO/MMT/binder combinations (as measured in percentage by mass, as referred to herein) include 50% binder, 0.0001 to 20% GO (such as 0.001 to 10%, such as 0.05 to 10%, such as 0.1 to 5%) and 30 to 49.99% MMT (such as 35 to 49% MMT, or such as 37 to 40% MMT). The binder is not particularly limited. Suitable materials include PVA and PVP, and their combinations, and the concentration of binder ranges from 1% to 99%. The total concentration of two types of sheets (LAR plus HAR sheets) ranges from 1 to 99%.

The thickness-normalized permeability data are presented in Table 1 and FIGS. 3-6. For these coatings, the weight fraction of PVA was kept constant at 50%, while that of the remaining MMT and GO were varied to make up the remaining 50% of solids. For comparison, coatings with the same weight fraction of GO were created with no MMT to show the influence of GO-MMT interaction. Coatings containing 50% MMT only with no GO were also prepared as a comparison.

A producer of thin film plastics can add a dip coating system to their film production line to coat thin films with the PVA/GO/MMT suspension of the invention to introduce high barrier properties before collection and shipping.

Currently, plastic films are produced to be thicker to lower their WVTR, which introduces processability and cost problems. Alternatively, thin films are coated with a low-permeability polymer, sometimes as a composite with a rod- or sheet-like nanofiller, although results from this method are insufficient to significantly block water vapor transport.

By employing the novel coating method of the present invention, it is possible to achieve low permeability with a coating less than one micron thick. Such a coating film could also minimize the substrate thickness required to achieve optimal mechanical and barrier properties.

Alternative embodiments of the present invention include, but are not limited to:

1. A mixture of GO flakes of different sizes (particularly, a blend of large micrometer scale and nanometer scale GO flakes) may be as effective as a mixture of GO and MMT in producing effective barrier properties, assuming that the mixture of GO of different sizes is equally or more effective in extending the larger GO [HAR] sheets to prevent curling.
2. Based on the same mechanism above, a mixture of GO flakes of different sizes (including large GO [HAR] sheets) in combination with MMT [LAR] sheets may also achieve superior barrier properties.
3. Using binder materials for coating other than PVA. Other conventional polymer binder materials (e.g., PVP) that allow for good dispersion and adhesion of MMT and GO or other suitable binary or ternary systems are also suitable, and can include aqueous-based or organic solvent-based. Aqueous solvents have the advantage of being less problematic from an environmental aspect, but the nature of the solvent is largely determined by the choice of binder.

Chemically modified GO and modified MMT are also compatible with the current design of the present invention and possess superior barrier properties.

Suitable alternatives to GO include any large sheet compounds such as alpha-zirconium phosphate and the like.

Suitable alternatives to MMT include any small sheet compounds such as laponite and the like.

Combinations of coating steps may be employed, such as an initial coating (by dipping, doctor blading, spraying, etc.) of a substrate with an aqueous suspension of GO/MMT/PVA, typically by submerging the substrate (such as a film) for a sufficient time (such as 1 to 30 seconds) before removing; followed by application of heat to the wet substrate to evaporate solvent and to initiate a cross-linking reaction (in cases where a cross-linker is present); followed by repeating of the coating and heating steps until a sufficient number of layers is formed. In an exemplary embodiment, four layers are generated in this manner.

In an exemplary embodiment, an organo-clay nanocomposite coating is used to improve the gas barrier and mechanical properties of thin plastic substrates.

Polyolefins (BOPP, LDPE and HDPE), polyethylene terephthalate (PET) and PLA are often employed as food packaging materials but suffer from high OTR which leads to widespread food spoilage. In a facile, scalable dip-coating process that represents an exemplary embodiment of the present invention, a coating layer consisting of a PVA binder and highly-oriented GO and MMT sheet fillers exhibits exceptional barrier properties, mechanical properties, and visible light transmittance. In another exemplary embodiment, chemical crosslinking is also used to induce even lower vapor permeability. Due to the incredible performance, ease of application, and versatility for chemical modification, the coating technology of the present invention as described herein is particularly well-suited to the field of food packaging technology.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke any limitations of any of the claims herein, except for those in which the claim expressly uses the words 'means for' together with an associated function.

The invention claimed is:

1. A nanocomposite coating composition, comprising: a polymer binder in an amount of 50 weight %; graphene oxide having a first aspect ratio in an amount of 0.01 to 10 weight %; and at least one montmorillonite filler having a second aspect ratio in an amount of 40 to 49.99 weight %, wherein the weight % is based on a total weight of the nanocomposite coating composition; and wherein the first aspect ratio is higher than the second aspect ratio.

2. The nanocomposite coating composition of claim 1, wherein the nanocomposite coating composition is cross-linkable.

3. The nanocomposite coating composition of claim 1, wherein the polymer binder is selected from the group consisting of poly(vinyl alcohol), polyvinylpyrrolidone, poly(acrylic acid), poly(2-oxazoline), polyethyleneimine, and polyacrylamide.

4. The nanocomposite coating composition of claim 1, wherein: the polymer binder is present in an amount of 50 weight %; the graphene oxide is present in an amount of 0.01 weight %; and the at least one montmorillonite filler is present in an amount of 49.99 weight %, wherein the weight % is based on a total weight of the nanocomposite coating composition.

5. An article comprising the nanocomposite coating composition of claim 1.

6. The article of claim 5, wherein the article possesses a water vapor transmission rate value of below about 25 gm/m²/day.

7. The nanocomposite coating composition of claim 1, wherein the first aspect ratio is greater than a factor of 500.

8. The nanocomposite coating composition of claim 3, wherein the polymer binder is poly(vinyl alcohol).

9. The nanocomposite coating composition of claim 1, wherein the nanocomposite coating composition possesses a water vapor transmission rate value of below about 25 gm/m²/day.

10. The nanocomposite coating composition of claim 9, wherein the water vapor transmission rate value is below about 17 gm/m²/day.

11. The nanocomposite coating composition of claim 1, wherein the nanocomposite coating composition possesses a water vapor transmission rate value of from 0.3 gm/m²/day to 3.6 gm/m²/day.

12. The nanocomposite coating composition of claim 1, wherein the nanocomposite coating composition possesses an oxygen transmission rate value of below about 0.2 cc/m²/day.

13. The nanocomposite coating composition of claim 1, wherein the nanocomposite coating composition possesses an oxygen transmission rate value of from 0.0007 cc/m²/day to 0.0945 cc/m²/day.

14. The nanocomposite coating composition of claim 1, wherein the nanocomposite coating composition has a thickness of from 263 nm to 655 nm.

15. The nanocomposite coating composition of claim 1, wherein the nanocomposite coating composition possesses an oxygen permeability of from $4.5850 \times 10^{-7}$ cm³·mm/m²·day·atm to $2.15 \times 10^{-5}$ cm³·mm/m²·day·atm.

16. The nanocomposite coating composition of claim 1, wherein the nanocomposite coating composition possesses a water vapor permeability of from $0.0024 \times 10^{-11}$ gcm(STP) cm/cm²·s·Pa to $0.0187 \times 10^{-11}$ gcm (STP) cm/cm²·s·Pa.

17. The nanocomposite coating composition of claim 1, wherein: the polymer binder is present in an amount of 50 weight %; the graphene oxide is present in an amount of 10 weight %; and the at least one montmorillonite filler is present in an amount of 40 weight %, wherein the weight % is based on a total weight of the nanocomposite coating composition.

18. The nanocomposite coating composition of claim 1, wherein: the polymer binder is present in an amount of 50 weight %; the graphene oxide is present in an amount of 1 weight %; and the at least one montmorillonite filler is present in an amount of 49 weight %, wherein the weight % is based on a total weight of the nanocomposite coating composition.

19. A process for creating a nanocomposite coating barrier on a surface of an article to resist intrusion by water and/or oxygen, comprising:

applying the nanocomposite coating composition of claim 1 to the surface.

20. The process of claim 19, wherein applying consists of at least one of the following: dip-coating, doctor blading, spin coating, rotational coating, spray coating, or roll-to-roll coating.

* * * * *